UNITED STATES PATENT OFFICE.

EUGENE VON NORDHAUSEN, OF NEW YORK, N. Y.

IMPROVED ARTIFICIAL MANURE.

Specification forming part of Letters Patent No. 41,331, dated January 19, 1864.

*To all whom it may concern:*

Be it known that I, EUGENE VON NORDHAUSEN, of the city and State of New York, have invented, made, and applied to use a certain new and useful Improvement in Artificial Manure; and I do hereby declare the following to be a full, clear, and exact description of the said invention and of the mode of compounding the same.

I make use of the residuum of the distillation of petroleum, usually known as "still bottoms," which contains sulphuric acid and resembles coke. I crush this and mix it with a corresponding weight of slaked lime. The mass is sprinkled with water and a sulphate of lime is produced. I add to this urine equal in quantity, or nearly so, to both the other substances, and mix the whole thoroughly. The excess of acid combines with the urine, producing a sulphate of ammonia. The mass is dried by being spread on sheet-iron plates and placed in an oven, or by any other suitable means. The product is a rich fertilizer containing carbon, sulphate of lime, and ammonia; and I prefer that the mass, when dry, be pulverized, in order that it may be more easily and uniformly applied as a manure for vegetation.

What I claim, and desire to secure by Letters Patent, is—

The production of artificial manure from the residuum of coal-oil or petroleum, substantially as described.

Dated December 15, 1863.

EUGENE VON NORDHAUSEN.

Witnesses:
    ANATOB LEMANN,
    LEMUEL W. SERRELL.